(12) United States Patent
Funston

(10) Patent No.: US 7,951,869 B2
(45) Date of Patent: May 31, 2011

(54) 2K WATERBORNE ISOCYANATE FREE COATING SYSTEM AND METHODS THEREOF

(76) Inventor: Randall A. Funston, Wichita Falls, TX (US)

( * ) Notice: Subject to any disclaimer, the term of this patent is extended or adjusted under 35 U.S.C. 154(b) by 0 days.

(21) Appl. No.: 12/388,847

(22) Filed: Feb. 19, 2009

(65) Prior Publication Data

US 2010/0040791 A1 Feb. 18, 2010

(51) Int. Cl.
*C08F 8/14* (2006.01)
*C08G 18/58* (2006.01)

(52) U.S. Cl. .......... 524/802; 525/65; 524/440; 524/556; 427/386

(58) Field of Classification Search ................. 523/409, 523/414
See application file for complete search history.

(56) References Cited

U.S. PATENT DOCUMENTS

| | | | | |
|---|---|---|---|---|
| 3,943,187 | A * | 3/1976 | Wu | 525/118 |
| 4,021,396 | A * | 5/1977 | Wu | 523/412 |
| 4,446,260 | A * | 5/1984 | Woods et al. | 523/409 |
| 5,196,055 | A * | 3/1993 | Lesney et al. | 106/14.12 |
| 5,201,436 | A * | 4/1993 | Owens et al. | 220/62.12 |
| 5,478,870 | A * | 12/1995 | Kudoh et al. | 523/409 |
| 5,567,761 | A * | 10/1996 | Song | 524/523 |
| 5,576,361 | A * | 11/1996 | Craun | 523/423 |
| 5,612,394 | A * | 3/1997 | Pfeil et al. | 523/403 |
| 5,767,175 | A * | 6/1998 | Kamekura et al. | 523/403 |
| 5,817,735 | A * | 10/1998 | Hatch et al. | 528/84 |
| 6,008,273 | A * | 12/1999 | Leibelt et al. | 523/409 |
| 6,645,341 | B1 * | 11/2003 | Gordon | 156/330 |
| 7,737,199 | B2 * | 6/2010 | Barker | 523/467 |
| 2005/0027074 | A1 * | 2/2005 | Lewin et al. | 525/123 |
| 2005/0154091 | A1 * | 7/2005 | Lohe et al. | 523/420 |
| 2005/0159537 | A1 * | 7/2005 | Huynh-Ba et al. | 524/507 |
| 2005/0256241 | A1 * | 11/2005 | Sachdev et al. | 524/439 |
| 2006/0135656 | A1 * | 6/2006 | Briand et al. | 523/401 |
| 2008/0311305 | A1 * | 12/2008 | Briand et al. | 427/407.1 |

FOREIGN PATENT DOCUMENTS

| EP | 024559 | * | 11/1986 |
|---|---|---|---|
| EP | 0933384 | * | 1/1999 |

OTHER PUBLICATIONS

Bisphenol A diglycidyl ether data sheet. No Author, No Date. lookchem.com.*
Bisphenol F diglycidyl ether data sheet. No Author, No Date. chemicalbook.com.*
Fox Equation data sheet. No Author, No Date. polymerchemistryhypertext.com.*
Reference: Polymer Properties. No Author, No Date. www.aldrich.com.*
Wu et al. Polymer 41 (2000) pp. 81-92.*
Wu et al. Polymer (2000) pp. 2017-2028.*

* cited by examiner

*Primary Examiner* — Mark Eashoo
*Assistant Examiner* — Michael A Salvitti
(74) *Attorney, Agent, or Firm* — Taras P. Bemko

(57) ABSTRACT

The present system is a waterborne coating composition comprising a low VOC (<50 g/l) acrylic epoxy coating which is capable of high build coating formation (>12 mils) without foaming. The coating composition may be made, stored and transported as a two-part composition, where each part is a pourable liquid. The waterborne acrylic epoxy composition cures under ambient condition to give tenacious adhesion to a variety substrates. The coating system, described herein, is designed as an ambient cure system, but may also be cured at elevated temperatures. The two component emulsion composition is useful for coating applications. One component is an emulsion comprised of a blend of a hydroxy functional acrylic polymer co-reactant, suitable additives, pigments and epoxy resin The second component is a waterborne amine hardener for curing or crosslinking the first component.

16 Claims, No Drawings

2K WATERBORNE ISOCYANATE FREE COATING SYSTEM AND METHODS THEREOF

RELATED APPLICATION

This application claims the benefit of U.S. utility patent application Ser. No. 12/128,609 filed May 28, 2008 and entitled "2K Waterborne Polyurethane Coating System and Method of Application" which is hereby incorporated by reference herein, and claims the benefit thereof.

TECHNICAL FIELD

The present disclosure relates to a waterborne coating system and method of application and, more particularly, to the use of a two-part aqueous polyurethane and/or acrylic modified epoxy coating system which provides for building solvent based equivalent film thickness without foaming or gassing while retaining properties of little or no volatile organic compound (VOC) or hazardous air pollutant (HAPs) emission.

BACKGROUND OF THE DISCLOSURE

Epoxy and polyurethane coatings are widely used for protection of substrates against corrosion and erosion caused by use and the environment. The types of surfaces treated include concrete, metal, and other surfaces. In addition to protection of substrates, coating systems need to be cost effective, easily applied and cured, have zero or very low VOC (volatile organic compound) and low toxicity.

Conventional epoxy resin systems have great adhesion to a number of substrates with good anticorrosive properties, lower coat, and relatively low toxicity when compared to isocyanates. However, epoxy coatings typically have poor durability or weathering characteristics when exposed to ultraviolet light. Further, most conventional epoxy systems require a high level of VOC for application.

Conventional polyurethane coatings have much better durability than epoxy resins with a greater resistance to yellowing and loss of gloss. Polyurethanes, utilizing solvents for thinning, have increased toxicity issues due to isocyanates and solvents, higher cost, and environmental issues due to VOC emissions.

Current state of the art methods for protection of metal substrates are to use an epoxy primer with a urethane topcoat to provide ultraviolet light protection for the system. Because of the increased costs of doing a two-coat system, OEM manufactures would prefer a one coat DMT (Direct To Metal) application that would provide both durability and excellent corrosion protection.

The use of epoxy compositions containing volatile organic solvents has fallen out of favor even though these compositions provide exceptional anti-corrosion protection. The organic solvent based compositions are environmentally unfriendly and their use has been curtailed by increasingly stringent regulation. Solvent free epoxy coatings often require sophisticated, non-standard equipment for application. Thus, the coating industry has turned to waterborne systems to address the VOC issue. Waterborne technology, as addressed in the co-pending application referenced hereinabove, has great potential to address VOC issues because water can be used for lowering application viscosity instead of the use of volatile organic compounds. One of the main concerns with conventional waterborne systems and improved in the above referenced co-pending application, has been quality issues for high build one-coat systems. Conventional waterborne coating systems are unable to provide high build one-coat systems because of foaming issues. These issues have been overcome as described herein below as well as the above referenced co-pending application.

Coating compositions provide good protection if applied at the recommended thickness. This recommended thickness requires multiple coats and each coat must be cured or set before another coat may be applied. Each additional coat requires additional labor, which increases the cost of application. Other coats may be applied at greater initial thickness, but require more time to set up. Coatings applied at greater initial thicknesses may also introduce flaws caused by voids from evaporation of volatile components during the curing process.

Conventional waterborne polyurethane coatings must still deal with the toxicity issues of handling isocyanates. In at least one embodiment, the instant disclosure presents a coating system having the ability to deliver a non-isocyanate DTM one-coat waterborne system at a VOC of less than 50 grams per liter at a film thickness of greater than 12 mils with better durability than a conventional epoxy resin.

Until the discoveries disclosed in the related application referenced herein, the coatings industry has been unsuccessful in developing a two part, water-borne polyurethane system that would build film thickness, like a solvent-borne industrial coating, where a minimum film build of two to three mils dry film thickness (DFT) is desired for commercial applications. Film thickness greater than two to three mils wet film thickness (WFT) in a water-borne polyurethane system had resulted in foaming and gassing. The foaming and gassing was primarily due to the reaction of isocyanate with moisture. Further conventional two part, water-borne polyurethane systems cannot achieve the desired product flow during application. The lack of proper flow frequently results with an eggshell type appearance which is unacceptable in higher scale commercial painting. Still further, newer environmental restrictions, that are being implemented across the United States, limit and/or eliminate the use of solvent-borne polyurethanes. Currently, the use of ultraviolet curing and polyasparitic technologies have been used to attempt an acceptable low VOC/HAP's free system.

Initially, aqueous polyurethane dispersions (PUDs), which may be one and/or two-component coating systems, appeared in response to higher solvent prices and the increased demand for low-VOC coatings. These are usually made by reacting mixtures of polyols and dimethylolpropionic acid with a polyisocyanate to give a complete polyurethane or an isocyanate-terminated prepolymer. This product is then dispersed in water (which may contain other isocyanate-reactive compounds) by neutralizing the acid groups with a base, typically a tertiary amine. Aqueous PUDs provide a low, but not zero VOC alternative to conventional two-component, solvent-based coating formulations. However, because they are only lightly crosslinked, coatings from aqueous PUDs often lack adequate solvent resistance, water resistance, gloss, hardness, and weathering properties. In addition, a cosolvent is usually needed for good coalescence, so solvents are not easy to eliminate from the formulations and therefore the mandated environmental requirements of low VOC's and HAPs have been difficult to achieve.

In the early 1990s, two-component (2K) aqueous polyurethane coatings arrived on the scene (see generally: P. Jacobs et al., "Two-Component Waterborne Polyurethane Coatings: Now and Into the Next Century" and cited references). Scientists discovered that it is possible to use water as a carrier for reactive 2K systems and still get coatings with good appearance and physical properties. Two-component aqueous polyurethane coating formulations are typically dispersions of separate polyol and polyisocyanate moieties. A coating film forms after water evaporates and the components react to give a crosslinked polymer network. While 2K aqueous polyurethane coatings should, in theory, match the properties available from solvent-based 2K systems, the coatings have, in practice, lacked adequate water, solvent, and chemical resistance (particularly, but not limited to, resistance to Skydrol), gloss retention, weatherability, flexibility, and impact resistance.

The success of aqueous 2K systems has, until now, relied on some important and often unwieldy formulation twists. For example, the polyol required, which needs both hydroxyl functionality for the polyurethane-forming reaction and acid groups for water dispersibility, is usually not commercially available. In one approach, an acrylate polymer with acid and hydroxyl functionalities is made by copolymerizing (in a free-radical polymerization) an acrylic acid monomer and a hydroxyalkyl acrylate monomer (e.g., hydroxyethyl acrylate or hydroxyethyl methacrylate). Unfortunately, hydroxyalkyl acrylates are rather expensive. In addition, it is difficult to make hydroxyalkyl acrylate polymers that have both high hydroxyl functionality and molecular weights low enough to have value for low-VOC, crosslinkable coating systems. The result is a lower level of coating physical properties than would otherwise be desirable. Recently developed hydroxy-functional acrylate polymers based on allylic alcohols and alkoxylated allylic alcohols overcome some of the limitations of using hydroxyalkyl acrylate monomers. However, the value of these resins has, until now, been demonstrated primarily for solvent-based polyurethane coatings or with high-styrene (>50 wt. %) resins, and not for aqueous polyurethane coatings.

A second common way to tweak the 2K aqueous polyurethane coating formulation is to modify the polyisocyanate. Most of the work to date has used a polyisocyanate modified by partially reacting it with a hydrophilic polyether. Making the polyisocyanate hydrophilic provides an emulsifiable crosslinker having improved compatibility with the co-reactants. This approach also has disadvantages, however. First, the hydrophilic polyisocyanate must be synthesized. Second, more of the expensive hydrophilic polyisocyanate must be used (compared with the unmodified polyisocyanates) to get the same NCO functionality contribution. Third, the hydrophilicity of the polyisocyanate is incorporated into the coating, often making its water sensitivity unacceptably high.

A third approach modifies the processing while keeping a commercial polyisocyanate in the formulation. The key concern is how to adequately disperse the polyisocyanate in water because emulsions made from commercial polyisocyanates tend to agglomerate and settle. Adding cosolvents and emulsifiers can help, but this at least partially defeats the purpose of using an aqueous system.

At present, two-package solvent-based polyurethane coatings are widely used as coatings for substrates, such as metals, wood, and plastics. These two-package solvent-base urethanes can be cured at room temperature or cured at relatively lower temperature. Such urethanes yield coatings with high levels of mar resistance and chemical resistance. They are so good that they often give more protection than is needed by the substrate. Because these coating compositions are made with organic solvents, which must be liberated into the atmosphere, they cause environmental problems which makes desirable a switch to non-toxic, e.g., aqueous-based compositions. Moreover, because the solvent-containing compositions are often reduced (i.e., thinned) with strong non-polar to medium polar solvents, they often attack and degrade plastic substrates to an undesirable degree. Non-polar thermoplastics, such as aromatic polycarbonates, e.g., of bisphenol-A and phosgene, or polyphenylene ethers, e.g., poly (2,6-dimethyl-1,4-phenylene) ethers, are capable of being dissolved and/or attacked by such non-polar solvents, and they can be distorted with excessive heat.

DETAILED DESCRIPTION OF EMBODIMENTS

In one embodiment, a two-component (2K) water based aqueous coating composition. It should be understood that various terms are used herein to describe the coating system such as, two-component (2K), two-part, and two-package. Further, the terms aqueous, waterborne, and water based are intended to be synonymous descriptive terms. As such, the specific term utilized should not be viewed as limiting.

Still further, the expression "isocyanate-reactive functionality" as utilized herein refers to the presence of functional groups that are reactive with isocyanate groups under conditions suitable for cured coating formation. Such isocyanate-reactive functionality is generally well known to those skilled in the coatings art and includes, most commonly, active hydrogen-containing functionality such as hydroxyl and amino groups.

By using a blend of various acrylic copolymers neutralized in water based emulsion and combining an emulsified polyester polyol to provide the resin system, adhesion to a various number of substrates was able to be achieved. Current technology necessary to provide direct to metal coating products that provide chemical resistance, gloss/color retention, and corrosion resistance have been achieved by the use of solvent based coating systems. Typically, such conventional coating products, to directly coat steel substrates, required blast abrasion of the surface prior to application, preferably to SP-5 or SP-10 requirements, to insure adhesion. Further, current aviation coating systems are of a chromate conversion coating which is a type of conversion coating applied to passivate aluminum, zinc, cadmium, copper, silver, magnesium, tin and their alloys to slow corrosion. The process uses various toxic chromium compounds which may include hexavalent chromium and thus may be released into the environment.

The system and method described herein can be applied to clean metal surfaces directly, without sand or waterblasting. However, it should be appreciated that due to individual preferences or internal specifications, primer coats may still be applied. Further, remarkable adhesion has been achieved on a variety of substrates including, but not limited to, aluminum, galvanized metal (both electroplated and hot-dipped), various stainless steels, PVC, carbon/fiberglass composites, and the like. This coating system can be applied at four to eight mils WFT, without foaming or gassing in the cured film as is typical with conventional water based systems. This accomplishment is accomplished synergistically using a combination of organic thickeners and pigments. Further, when combined with tin catalyst, MDI & HDI isocyanates the product meets the military specification requirements for conversion coat primer used by the aviation industry. The instant coating systems can be applied to a variety of solid substrates by conventional methods, such as flowing, spraying or dipping, to form a continuous surface film.

The acrylic polyol component of the present disclosure contains both functionality capable of reacting with isocyanate groups and hydrophilizing functionality capable of rendering the surface active isocyanate reactive material water dispersible. Hydroxyl functionality is typically utilized as the isocyanate-reactive functionality in coatings and is preferred for use in the present system.

In at least one embodiment, the acrylic polyol is an acrylic copolymer having the hydrophilizing groups and isocyanate-reactive functionality incorporated into the polymer via appropriate monomer selection or subsequent modification. Examples of monomers that may be utilized to synthesize the acrylic polyol include carboxyl group-containing ethylenically unsaturated monomers and hydroxyl group-containing ethylenically unsaturated monomers.

Although water can be used exclusively, other polar liquid solvents can replace part of the water, e.g., for volatility control. Alcohols are suitable for such purposes, including lower aliphatic alcohols such as methanol, ethanol, propanol, isopropanol, such as methanol, ethanol, propanol, isopropanol, n-butyl alcohol and t-butyl alcohol. Mixtures of such alcohols can also be utilized.

The coating system, described herein, meets the Military Specification (MIL spec—PRF-85582D) for VOC (50 grams/liter or less) and contains no HAPs. In order that those skilled in the art may better understand the disclosure herein, the following examples are given by way of illustration and not by way of limitation.

In order to achieve the necessary film formation, this coating system must be manufactured under higher shear than can be obtained using high speed dispersion equipment. Preferably, the required shear is achieved through, but not limited to, a sand/bead/pebble/SW/horizontal milling process. The addition of any additives is preferably made in a specifically chosen order to obtain desired sag resistance. When desired, thinning is preferably done to the base prior to mixing the component A and component B. However, the thinning may also be applied at other steps such as, but not limited to, thinning after mixing components A and B. The thinning is preferably limited to a range of 0 to 25% water. It is contemplated herein that those skilled in the art, will recognize, with time and further study, that other methods of thinning may be discovered which still maintain the desired characteristics of the coatings disclosed herein as well as the desired low VOC's and HAP's. Thus, the exact and/or preferred methodology of thinning, disclosed herein, should not be viewed as a limitation herein. It should be further understood that the improper use or the unnecessary elimination of this step (thinning) will likely result in an unwanted viscosity and undesired air entrapment in the coating.

Preferably, the desired 2K coating system is comprised of a part A and a part B. Part A is preferably a carboxyl group-containing urethane prepolymer, said prepolymer dispersed in a polar liquid medium comprising predominantly water. Part B is preferably a hexane, 1,6-diisocyanato-homopolymer poly(oxy-1,2-ethanediyl), alpha-tridecyl-o mega,-hydroxy-phosphate. In at least one embodiment, part A includes solids in a range of 30-70% by weight. In one embodiment, these solids may be a water dispersible thermoplastic carboxylated acrylic polymer. In another embodiment, a zinc having a unique particle structure is added in a range of up to 20% by weight.

Various embodiments of the coating system may be utilized to form a DTM topcoat, a water based zinc primer, and/or a water based zinc conversion coating primer. Each of these coating systems preferably employs the two-component (parts A and B) formulation.

Example 1

DTM Topcoat Formulation

The preferred mixture of parts A and B is a 2:1 mix ratio by volume.

Part A Formulation:
Acrylic Copolymer (preferred range—20-70%)
Acrylic Urethane Polyol (preferred range—20-70%)
Modified poloydimethyl siloxane (preferred range—0.25-2.0%)
Ti02 (preferred range—10-30%)
Polyurethane based thickening agent (preferred range—0.2-0.5%)
Diphenyl poloyglycol ether (preferred range—0.2-0.5%)
Polymeric non-ionic dispersant (preferred range—0.2-0.5%)
Hindered amine light stabilizer (preferred range—0.2-1.0%)
Hydroxyphenyl-benzotriazole UV Absorber (preferred range—0.2-1.0%)
Non-ionic Surfactant (preferred range—0.2-1.0%)
Water (preferred range—5-25%)

Part B Formulation:
Aliphatic polyisocyanate (preferred range—80-100%)
Diethylene Glycol Monobutyl Ether (preferred range—0-20%) (optional)
Note: It should be understood that increased viscosity and/or poor film coalescence may result without the addition of the diethylene glycol monobutyl ether.

Example 2

Water Based Zinc Primer Formulation

The preferred mixture of parts A and B is a 3:1 mix ratio by volume.

Part A Formulation:
Acrylic Copolymer (preferred range—20-70%)
Acrylic Urethane Polyol (preferred range—20-70%)
Modified poloydimethyl siloxane (preferred range—0.25-2.0%)
Ti02 (preferred range—5-10%)
Zinc pigment (preferred range—10-20%)
Magnesium silicate (preferred range—5-15%)
Calcium Carbonate (preferred range—5-15%)
Calcined kaolin clay (preferred range—5-15%)
Carbon Black (preferred range—0.2-2.0%)
Polyurethane based thickening agent (preferred range—0.2-0.5%)
Diphenyl poloyglycol ether (preferred range—0.2-0.5%)
Polymeric non-ionic dispersant (preferred range—0.2-0.5%)
Hindered amine light stabilizer (preferred range—0.2-1.0%)
Hydroxyphenyl-benzotriazole UV Absorber (preferred range—0.2-1.0%)
Non-ionic Surfactant (preferred range—0.2-1.0%)

Part B Formulation:
Aliphatic polyisocyanate (preferred range—80-100%)
Diethylene Glycol Monobutyl Ether (preferred range—0-20%) (optional)
Note: It should be understood that increased viscosity and/or poor film coalescence may result without the addition of the diethylene glycol monobutyl ether.

Example 3

Water Based Zinc Conversion Coating Primer Formulation

The preferred mixture of parts A and B is a 3:1 mix ratio by volume.

Part A Formulation:
Acrylic Copolymer (preferred range—20-70%)
Acrylic Urethane Polyol (preferred range—20-70%)

Modified poloydimethyl siloxane (preferred range—0.25-2.0%)
TiO2 (preferred range—5-10%)
Zinc pigment (preferred range—10-20%)
Magnesium silicate (preferred range—5-15%)
Calcium Carbonate (preferred range—5-15%)
Calcined kaolin clay (preferred range—5-15%)
Carbon Black (preferred range—0.2-2.0%)
Polyurethane based thickening agent (preferred range—0.2-0.5%)
Diphenyl poloyglycol ether (preferred range—0.2-0.5%)
Polymeric non-ionic dispersant (preferred range—0.2-0.5%)
Hindered amine light stabilizer (preferred range—0.2-1.0%)
Hydroxyphenyl-benzotriazole UV Absorber (preferred range—0.2-1.0%)
Non-ionic Surfactant (preferred range—0.2-1.0%)
Part B Formulation:
Polomeric MDI (preferred range—2-100%)
Aliphatic polyisocyanate (preferred range—0-8%)
Diethylene Glycol Monobutyl Ether (preferred range—0-20%) (optional)
    Note: It should be understood that increased viscosity and/or poor film coalescence may result without the addition of the diethylene glycol monobutyl ether.
    In at least one embodiment, the following performance characteristics were successfully tested:

improved barrier resistance. Part B is preferably made by blending the isocyanate with diethylene glycol monobutyl ether for the topcoat and diethylene glycol monobutyl ether plus polomeric MDI in the zinc primer. Preferably, the two components are stored at temperatures in a preferred range of between 50-100° F.

In order to achieve the necessary film formation, this product must be manufactured under higher shear than can be obtained using conventional high speed dispersion equipment. The higher shear is preferably obtained through two separate steps. First a bead mill (such as, but not limited to, a Red Head Horizontal mill) is utilized to disperse the organic and inorganic pigments. The second step preferably blends the resin and predispersed pigment slurry until a homogenous mixture is achieved. Such high speed dispersion equipment may be but is not limited to Myers Cowels High Speed Dispersion Equipment. It should be understood that other methods of achieving the higher shear is contemplated herein and should not be viewed as a limitation herein. It should be further understood that the addition of the additives is preferably in a particular order to obtain the desired sag resistance, however, the exact order of additive addition should not be viewed as a limitation herein.

The preferred method of application requires that the target surface be free of substantially all oil, grease, dirt or other contaminants. Preferably, the surface may be washed with a TOP COAT PERFORMANCE PROPERTIES
Product: Aqua Thane series Acrylic Polyurethane

| Test | Spec Requirements | Test Method |
| --- | --- | --- |
| VOC | <50 grams/liter | EPA Method 24 |
| DFT | 2.0-2.5 mils | ASTM D4138-07 |
| Mix Ratio | 2:1 by volume | As formulated |
| Storage Stability | 6 months in plastic container | Manufacture Certification |
| Pot Life | 4 hours | #4 Ford - 8 seconds increase at 4 hours |
| Thinning | 0-25% with water | Manufacture Requirement |
| Dry Time | Dry hard: overnight Full Cure: 7 days | ASTM D1640 |
| Gloss | >/=90% | ASTM D523-89 |
| Gloss Retention | >/=80% | After 500 hours Xenon Arc testing ASTM D523 |
| Humidity Cabinet | 30 days | ASTM D1748 |
| Flexibility | Not less than 10% | GE impact |
| Adhesion | >/=4A | ASTM D3359 |
| Water Resistance | Immersion in water @ 120° F. for 4 days | Visual |
| Salt Spray | 2,000 hour minimum | ASTM B117 |
| Solvent Resistance | 50 MEK rubs | Visual |
| Fluid Resistance | 24 hour immersion in hydraulic fluid & lubricating oil | Visual |

The coating systems described herein are preferably manufactured as follows. Part A is preferably made using high shear by a bead mill to disperse the pigments. Next, a high speed disperser is used to incorporate the resins and additives in the product described herein. It has been discovered, that one of the important features of an additive is the consistency of the zinc. Typically, zinc is added in the form of zinc dust. However, in at least one embodiment, the coating described herein, utilizes a zinc flake instead of dust. The zinc flake provides, in at least one aspect, the advantage of a larger surface area than a zinc dust particle. Thus, the cathodic protection, of the target surface, is preferably both increased and is achieved through the use of less zinc product. Those, skilled in the art, will appreciate this aspect as the "overlap" effect of the flakes (versus dust particles) will provide an solvent or other surface cleaner in accordance with SSPC-SP1. However, it should be appreciated that due to environmental issues cleaners other than solvents should be utilized on the target surface. These alternatives to solvent will provide the desired preparation as well as substantially prevent or reduce potential HAPs and/or VOC emissions. It should be understood, by those skilled in the art, that such products are identified in the industry as green adhesion promoters. It should be understood that other cleaning methodology may be employed and the method of cleaning should not be view as a limitation herein. Further, it should be understood that the material of the substrate, to be coated, may direct the preferred materials used for the cleaning.

The surface should also be substantially free of any rust, paint, or other debris which may prevent the coating from being applied to the target substrate. Such preparation may be carried out in accordance with SSPC-SP2. If the surface has been previously painted or coated, it is preferable that any glossy surfaces be sanded or primed. A preferred primer is Aqua-Bond ACWP-W-300 manufactured by Excalibur Paint & Coatings, Ltd (Aqua-Bond is a common law trademark of Excalibur Paint & Coatings, Ltd). If the substrate requires a wash/conversion coating (either by specification or owner requirement), the substrate may preferably be coated with ACWP-W-300 and followed with an intermediate coating of ACWX-W-300 (manufactured by Excalibur Paint & Coatings) and/or ACWP-W-300. It should be understood that in one embodiment, the herein described coating system may, when necessary or desired, be applied directly to a surface substrate with substantially no surface preparation.

For optimum results, the herein described coating system is preferably applied when temperatures are in a range of 60 to 80 degrees Fahrenheit with a relative humidity below 70%. However, those skilled in the art can appreciate that such optimum conditions may be difficult to encounter. As such, application under various circumstances, requiring longer or shorter drying times, and/or artificial temperature controls are contemplated herein and should not be viewed as a limitation of the herein described system and method. As mentioned herein above, the coating system may be applied utilizing a variety of spray systems, brushes, rollers, and the like.

Prior to application, the two components (Part A and Part B) must be mixed and/or thinned. Preferably, each part should be thoroughly mixed in its own container much akin to mixing a conventional container of paint (i.e. so that no pigment remains at the bottom of the container and that the color is uniform). Part A and Part B should be mixed together according to the proper mix ratio by volume for approximately two to three minutes. It should be understood that this mixing time is a preferred range but factors such as mixing equipment, weather, temperature, environment, and the like may influence the required mixture time and should not be viewed as a limitation herein. Preferably, components A and B, when mixed have a pot life of approximately 4 hours at temperatures of about 70 degrees Fahrenheit and a relative humidity of 50%. It should be understood, by those skilled in the art, that the pot life will vary at different conditions and that only a sufficient quantity of parts A and B should be mixed so as to not exceed the pot life thus wasting the coating material. It is further preferable to allow a period of approximately one half hour after mixing parts A and B and prior to the application of the coating system on a target surface. When necessary or desired, the mixture can be thinned. Preferably, the thinning is done to the base prior to mixing parts A and B by adding up tp 25% water, by weight. As disclosed hereinabove, it is contemplated that other thinning methodology may be incorporated and as such should not be viewed as a limitation herein. It should be understood that improper or undesired viscosity and air entrapment could result if thinning is not performed when necessary. Preferably, but not limited to, the thinning is done after Part A and Part B have been mixed. It should be further understood that there should be approximately a four hour wait time between topcoating the zinc primer with the urethane topcoat (at the preferred temperature of approximately 75° F.). The topcoat should be given at least a twenty four (24) hour cure time prior to striping, stenciling, or recoating. It should be apparent that this cure time depends on environmental conditions and may vary.

In yet another embodiment, there is a novel waterborne coating composition, which is an acrylic epoxy composition having a VOC in a range of 0-50 grams per liter and capable of high build coating formation without foaming. The waterborne coating system is a two component emulsion system useful for coating applications, wherein each part is a pourable liquid. The coating composition may be made, stored and transported as a two-part composition. This coating system is designed as an ambient cure system to give tenacious adhesion to a variety of substrates including galvanized substrates with superior anticorrosive properties. The disclosed coating system will also work at elevated temperatures. This coating system is also a non-isocyanate composition. Thus, it is very amenable for use where isocyanate is prohibited and/or highly avoided. The coating has shown to have better durability than a typical epoxy system.

In at least one embodiment of the isocyanate free coating system, the following performance characteristics were successfully tested:

| Isocyanate - Free DTM Performance Properties | | |
| --- | --- | --- |
| Property | Requirement | Results |
| Gloss (60° angle) | ASTM D-523 | >90 |
| Adhesion - | ASTM-D-3359- Wet Tape 24 Hours - DI H$^2$0 - Ambient Temperature - 4A | Pass |
| Hardness - | ASTM D 3363 Pencil Test | (2H) Pass |
| Impact | ASTM D 2794 | |
| | Direct Intrusion Greater than 30" lbs. | 60 Pass ">60 Pass |
| | Reverse | 40 Pass ">40 Pass |
| Flexibility - | >40% Elongation GE Impact | >60 Pass |
| Low - Temp. Flexibility | No Cracking - 1 inch bend | Pass |
| Humidity Resistance | ASTM D-1735 500 hours | Pass |
| Weather Resistance | Xe-arc 1,000 hrs. E < 2.0 Gloss 80 minimum | Pass Pass |
| Weather Resistance | QUV - A - ASTM D 523 - 1,000 hrs. Color Difference - Less than 3 Delta E 60° Specular Gloss - 85 minimum | Pass >88 Pass |
| Solvent | 50 MEK Rubs | Pass |

-continued

| Property | Requirement | Results |
|---|---|---|
| Isocyanate - Free DTM Performance Properties | | |
| Resistance | | |
| Fluid | Lubricating Oil - 24 hours - 250° F. | No effect |
| Resistance | Jet Fuel - JP - 5-7 days room temperature | No effect |
| | Hydraulic Oil 24 hours - 150° F. | No effect |
| Surface Finish | No irregularities, orange peel | Pass |
| Salt Fog | ASTM-B-117 - 1000 Hours Blister Corrosion | |
| Field | 10 10 | Pass |
| Scribe | 10 10 | Pass |

Bonderite 1000 treated panels were coated to achieve a D.F.T. of 3.5 mils. The panels were allowed to cure for seven (7) days at 77° F. (25°) prior to testing.

In one embodiment, a first component (Part A) may be an emulsion comprised of a blend of a hydroxy functional acrylic polymer co-reactant, suitable additives, pigments, and epoxy resin The second component (Part B) is preferably a waterborne amine hardener for curing or crosslinking the first component. It should be understood that the mixing, manufacturing, and application of all embodiments disclosed herein are preferably substantially the same. However, it should be further understood that that some variations in the mixing, manufacturing, and application will be seen by those skilled in the art and should not be viewed as a limitation herein.

A preferred method of manufacturing the first component may entail charging a reactor with the hydroxy functional acrylic polymer, pigments, and suitable surfactants and defoamers. Next a bead mill is used to disperse organic and inorganic pigments of the first component. The epoxy resin is then preferably blended into the mixture using a high speed dispersion machine, thus substantially achieving a substantially homogenous mixture. Suitable pigments may be selected from organic and inorganic color pigments which may include, but not limited to, titanium dioxide, carbon black, lampblack, barium sulfate, magnesium silicate, calcium silicate, mica, micaceous iron oxide, calcium carbonate, zinc powder, aluminum and aluminum silicate, gypsum, feldspar zinc oxide, natural and synthetic red, black, brown and yellow iron oxides, toluidine and benzidine yellow, phthalocyanine blue and green, and carbazole violet, and extender pigments including ground and crystalline silica and the like. In one embodiment, the first component may contain the zinc pigment in a range of 10-20% by weight. It should be understood that the amount of pigment used, to form the composition, may vary and as such should not be viewed as a limitation herein. The amount of variation may depend on the particular composition application and may be zero when a clear composition is desired. A preferred acrylic epoxy composition may comprise up to about 50 percent by weight fine particle size pigment and/or aggregate. It should be further understood that using greater than 50 percent by weight fine particle size pigment and/or aggregate ingredient may produce a composition that may be too viscous for application. Depending on the particular end use, a preferred coating composition may comprise approximately 20 percent by weight fine particle size aggregate and/or pigment. The composition may further include a desired amount of pigment up to about 24% in order to achieve the desired coating color. It should be appreciated that in some embodiments, the pigment may be utilized so as to make up about 6% of weight of the total composition. In one embodiment the pigment may be titanium dioxide. The pigment may be dispersed in either component of the two-part composition. Next desired additives may be added to increase sag resistance.

The second component may preferably be an emulsion of an amine curing agent with water. The second component may also include pigments and additives such as, but not limited to, a non-reactive diluent, a water-based latex resin, a defoamer, a corrosion inhibitor, ultraviolet stabilizer, HALs or other desired materials. Preferably, the first and second components are mixed together prior to application onto a desired surface. Thus, substantially yielding a single DTM coating with a thickness of from approximately 2 mils to approximately 16 mils.

The waterborne acrylic epoxy composition broadly includes a hydroxy functional acrylic polymer, epoxy resin, an amine-based curing agent, and water. The composition may be enhanced with additives, including a non-reactive diluent, a reactive diluent, an organosilicon adhesion promoter, pigments, thixotropes, thickeners, associative thickners, ultraviolet absorbers, hindered amine light stabilizers, corrosion inhibitors, or other materials Each element of the general formula will be discussed in detail hereinbelow. Further, several embodiments of the composition and preferred methods of production and application will also be disclosed. One component may be an emulsion comprised of a blend of a hydroxy functional acrylic polymer co-reactant, suitable additives, pigments and epoxy resin The second component may preferably be a waterborne amine hardener for curing or crosslinking the first component. By utilizing a blend of various acrylic copolymers neutralized in a water based emulsion, adhesion to various substrates was achieved. The acrylic polyol component disclosed herein preferably contains both hydroxy functionality and hydrophilizing functionality capable of rendering the epoxy resin water dispersible. In some embodiments, the second component may comprise a range of 0.04% to 18.5% by weight of a corrosion inhibitor.

In at least one embodiment, the acrylic polyol is an acrylic copolymer having the hydrophilizing groups and hydroxy functionality incorporated into the polymer via appropriate monomer selection or subsequent modification. Thus, the hydroxy functional acrylic polymer may be an acrylic resin composition dispersed in water containing a carboxyl group-containing monomer and a hydroxyl group-containing monomer with a neutralizing base. In another embodiment, the hydroxy functional acrylic polymer may contain a reactive emulsifier as a constituent. In yet another embodiment, the acrylic polymer may be comprised of essentially polymerized monomers of at least two alkyl methacrylates or alkyl acrylates with at least one hydroxyl alkyl methacrylate or hydroxyl alkyl acrylate. In one embodiment, the acrylic polymer may comprise a range of about 60-90% by weight of at least two alkyl methacrylates and about 10-30% by weight of hydroxyl alkyl methacrylate or hydroxyl alkyl acrylate. In yet another embodiment, the polymer may have a weight average molecular weight of in a range of about 3,000 to 10,000 and a glass transition temperature of about −20 degrees to +50 degrees Celsius. Still further, in another embodiment, the hydroxy functional acrylic polymer may contain styrene. Examples of monomers that my be utilized to synthesize the acrylic polyol include, but not limited to, carboxyl group-containing ethylenically unsaturated monomers and hydroxyl group-containing ethylenically unsaturated monomers. Those skilled in the art will understand that there are a variety of conventionally available hydroxy functional acrylic polymers that can be utilized for the coating systems disclosed herein. A preferred range for the hydroxy functional acrylic polymer is 20% to 80%.

Preferably, after addition of the hydroxy functional acrylic polymer, the pigment is bead milled, ball milled or sand milled to the same fineness of grind before addition of the epoxy resin. Selection of a fine particle size milling provides a smooth, uniform surface appearance after application. Additives may be incorporated into the system before or after bead milling. Suitable additives may include, but are not limited to, flow control agents, defoamers, thixotropes, thickeners, associative thickners, ultraviolet absorbers, hindered amine light stabilizers, corrosion inhibitors, or other desired additives. After bead milling the acrylic polymer, pigments, and selected additives, the epoxy resin is preferably blended into the mixture using a high speed dispersion machine preferably achieving substantially homogenous mixture. Further, desired or selected additives may be added to increase sag resistance.

The epoxy resin may be liquid, solid, or semi-solid. Preferably, the epoxy resin functions as the curable component of one part of the two-part acrylic epoxy coating composition. In one embodiment, the epoxy resin may consist of, but not be limited to, bisphenol A, bisphenol F, epoxy phenol novolac, epoxy cresol novolac, naphthalene epoxy, or tertiary butyl cathecol epoxy. It should be appreciated that other epoxies may be used although those listed above have been found to be preferred. In another embodiment, the epoxy resin may be a liquid bisphenol A epoxy resin. Those skilled in the art understand that a variety of conventional liquid and/or water bisphenol A epoxy resins exist and can be utilized and are therefor not listed herein. Further, a conventional solid epoxy "one type" resin dispersion may be utilized. It should be appreciated that all though various epoxy resins are described herein, it has been found that bisphenol A is a preferred starting epoxy resin.

In addition to aromatic epoxy resins such as bisphenol-A type epoxy resins, other epoxy resins such as aliphatic epoxy resins may be utilized. Examples of aliphatic epoxy resins include, but are not limited to: 1) glycidyl ethers of aliphatic moeities such as, but not limited to, the diglycidyl ether of neopentyl alcohol; 2) the diglycidyl ether of 1,6-hexanediol, 3) the diglycidyl ether of 1,4-butanediol; 4) the triglycidyl ether of 1,1,1,-trimethoxy propane; 5) diglycidyl ether of cyclohexanedimethanol; 6) polyepoxide of castor oil a; and 6) diglycidyl ether of hydrogenated bisphenol-A. It should be understood that the above is not an exhaustive list but is described herein for convenience and a better understanding. Those skilled in the art will understand that other aliphatic epoxy resins may exist or may be created to accomplish substantially the same composition as described herein. As such, they should not be viewed as a limitation herein. In various embodiments, the epoxy resin is present in the composition in an amount in the range of about 5% to about 90% by weight. In another embodiment, the range is preferably about 8% to about 30% by weight. In yet another embodiment, the range is preferably about 12% to about 25% by weight. It should be understood that the epoxy resin, in the hereinabove disclosed ranges, may be a liquid epoxy resin as well a solid or a semi-solid epoxy resin.

The composition may further include a reactive diluent. The reactive diluent may be an aliphatic, cycloaliphatic, or aromatic epoxy functional diluent. Other examples, again not to be construed as a limitation, include monofunctional reactive diluent such as phenyl glycidyl ether, cresyl glycidyl ether, n-butyl glycidyl ether, alkyl C12-C14 glycidyl ether, and nonyl phenol monoglycidyl ether. Monofunctional reactive diluents may be added to lower the crosslink density and obtain improved flexibility for the coating. The epoxy resin may also be modified with an acrylate resin such as, but not limited to, 1,6-hexanediol diacrylate or 1,1,1-trimethylol propane triacrylate to obtain additional crosslinking with the amine hardener resulting in improved chemical and solvent resistance.

In various embodiments, the amount that a curing agent is present in the composition is dependent on the amine hydrogen equivalent weight (AHEW) of the amine curing agent or hardener. The amine curing agent is added at a level wherein the first component and second component are mixed in a ratio to provide a coating composition preferably having 0.70 to 1.60 equivalents of total epoxy groups to 1.00 equivalent of N—H linkages capable of reacting with the epoxy groups and more preferably 0.9 to 1.2 equivalents of total epoxy groups to 1.00 equivalent of N—H linkages capable of reacting with epoxy groups.

The curing agent is preferably a substantially solvent free, or a water dilutable polyamine having a plurality of N—H linkages capable of reacting with the epoxy resin. The amine-based curing agent may be a polyoxyalkylene polyamine, arylene polyamine, cyclo-aliphatic polyamine, Mannich base, or a combination thereof. A non limiting example of a solvent free amine curing agent used in an embodiment is a polyoxypropylene polyamine. There are several commercially available conventional water-based amine curing agents utilized in the embodiments disclosed herein. Further, the curing agent may be a water soluble polyamine which acts as an epoxy resin emulsifier.

Examples of aliphatic amine curing agents include, but are not limited to, ethyleneamines and etheylenamine adducts with epoxy resin or styrene oxide. Non limiting examples of ethyleneamines are diethylenetriamine (DETA), triethylenetetramine (TETA), tetraethylenepentamine (TEPA) and N-aminoethylpiperazine (AEP). Those skilled in the art will understand that various conventional aliphatic amine curing agents, polyamide curing agents, and amidoamine curing agents are available. Further, arylyl amine curing agents including, but not limited to, metaxylene diamine (MXDA) and metaxylene diamine adduct with an epoxy resin or styrene oxide may be utilized. Still further, various conventional polyetheramines are available. Non limiting examples of cycloaliphatic amine include (bis-(p-aminocyclohexyl)methane) (PACM) and diaminocyclohexane (DACH). Various conventional cyclaliphatic amine hardeners are also available. Non limiting examples of aromatic amines include aromatic amine hardeners such as methylene dianiline (MDA) or m-phenylene diamine (m-PDA).

A Mannich base is an amine compound which contains a phenolic hydroxyl in addition to amine hydrogen groups.

Conventional Mannich base compounds as well as conventional phenalkamine curing agents are readily available.

A non-reactive diluent may be added to decrease the viscosity of the mixture. Any diluent that does not react with the other elements of the composition and decreases viscosity may be used. In one embodiment, a non-reactive diluent may comprise 0.1% to 5% by weight of the total composition. In an embodiment, the non-reactive diluent may be an aromatic hydrocarbon resin. In another embodiment, the non-reactive diluent may be benzyl alcohol, which not only reduces viscosity, but also speeds the epoxy/amine reaction and helps prevent freezing or crystallization of the coating composition. The non-reactive diluent may be included in either or both components of the composition. The composition may further include a silicone adhesion promoter to enhance the adhesion of the cured composition to the surface being coated. The silicone adhesion promoter may preferably be added in a ratio in a range of about ½ part-2 parts to 100 parts of epoxy resin. In one embodiment, the first component further comprise 0.1% to 0.5% by weight of an organosilicon adhesion promoter. In one embodiment, the organosilicon adhesion promoter is .gamma.-glycidoxypropyl-trimethoxy silane. The composition may further include up to about 0.6% of a defoamer, such as a silicone defoamer, a non-silicone defoamer or a combination thereof.

The embodiments of the waterborne acrylic epoxy coating composition may be applied with a brush, roller, or airless sprayer to produce cured coatings with a thickness of from approximately 2 mils to approximately 16 mils. It should be appreciated that a preferred thickness may vary with the type of application. For some applications a cured coating thickness may be in a range of approximately 4 mils to approximately 12 mils. Others may prefer or require a thickness in a range of approximately 6 mils to approximately 10 mils. It has been discovered, through testing, that the coating composition exhibits gel times in about 3 hours, are substantially dry to touch in less than 40 minutes, and dry substantially hard within 2 hours at ambient conditions. However, it should be understood that the times may vary and are generally dependent on the surrounding environmental conditions.

Obviously, other modifications and variations of the present disclosure are possible in the light of the above teachings. It is therefore to be understood that changes may be made in the particular embodiments described above which are within the full intended scope of the instant disclosure as defined in the appended claims.

While the present system and method has been disclosed according to the preferred embodiment, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the system or methods disclosed herein to those particular embodiment configurations. These terms may reference the same or different embodiments, and are combinable into aggregate embodiments. The terms "a", "an" and "the" may also mean "one or more".

None of the description in this specification should be read as implying that any particular element, step or function is an essential element which must be included in the claim scope. The scope of the patented subject matter is defined by the allowed claims and their equivalents. Unless explicitly recited, other aspects of the instant disclosure as described in this specification do not limit the scope of the claims. Because many varying and different embodiments may be made within the scope of the concept(s) herein taught, and because many modifications may be made in the embodiment herein detailed in accordance with the descriptive requirements of the law, it is to be understood that the details herein are to be interpreted as illustrative and not in a limiting sense.

I claim:

1. A two-component emulsion composition for use in coating surfaces, the emulsion composition comprising:
   a first component, said first component having 20% to 80% by weight of a hydroxyl functional acrylic polymer;
   said first component further having 5% to 80% by weight of an epoxy resin;
   a second component, said second component having 10% to 90% by weight of an amine curing agent, wherein said amine curing agent being capable of crosslinking said first component;
   said second component further having water, wherein the amount of said water being at least sufficient to provide desired application viscosity, wherein said first component and said second component are mixed to provide the emulsion coating composition;
   said two-component emulsion composition having a volatile organic compound content of less than 50 grams/liter;
   said two-component emulsion composition being substantially Hazardous Air Pollutant (HAP) free; and
   said two-component emulsion composition being free of isocyanates.

2. The two-component emulsion composition of claim 1, wherein a thermoset two-component emulsion composition forms coatings in a single coat having a thickness range of approximately 2 mils to approximately 16 mils.

3. The two-component emulsion composition of claim 1, wherein the epoxy resin is a liquid epoxy resin.

4. The two-component emulsion composition of claim 1, wherein the epoxy resin is a glycidyl ether of a polyhydric phenol.

5. The two-component emulsion composition of claim 4, wherein the epoxy resin is selected from the group consisting of bisphenol A, bisphenol F, bisphenol AD, catechol, and resorcinol.

6. The two-component emulsion composition of claim 1, wherein the epoxy resin is a glycidyl ether of an aliphatic, or a cycloaliphatic, or an aromatic diol or polyol.

7. The two-component emulsion composition according to claim 1, wherein the epoxy resin is a solid epoxy resin dispersion.

8. The two-component emulsion composition of claim 1, wherein the epoxy resin has an epoxide equivalent weight between 140 and 1,800 and wherein the epoxy resin is a liquid, or a semi-solid, or a solid epoxy resin.

9. The two-component emulsion composition of claim 1, wherein the acrylic polymer has a weight average molecular weight of in a range of about 3,000 to 10,000 and a glass transition temperature of about −20 degrees to +50 degrees Celsius.

10. The two-component emulsion composition of claim 1, wherein the amine curing agent is selected from the group consisting of an aliphatic amine, polyamide amine, amidoamine, cycloaliphatic amine, aromatic amine, arylyl diamine, polyetheramine, phenalkamine and Mannich base.

11. The two-component emulsion composition of claim 10, wherein the aliphatic amine is an ethyleneamine, and wherein the ethyleneamine is selected from the group consisting of a diethylenetriamine (DETA), triethylenetetramine (TETA), tetraethylenepentamine (TEPA), and N-aminoethylpiperazine (AEP).

12. The two-component emulsion composition of claim 11, wherein the ethyleneamine is an ethyleneamine adduct with epoxy resin or styrene oxide.

13. The two-component emulsion composition of claim 1, wherein the amine curing agent is an arylyl diamine.

14. The two-component emulsion composition of claim 1, wherein the composition further includes 6% to 24% by weight of a pigment based on the total composition.

15. The two-component emulsion composition of claim 13, wherein the arylyl diamine curing agent is metaxylene diamine (MXDA) or metaxylene diamine adduct with an epoxy resin or styrene oxide.

16. The two-component emulsion composition of claim 1, wherein the hydroxyl functional acrylic polymer is an acrylic polyol.

* * * * *